Oct. 1, 1940.　　　W. E. KNAPP　　　2,216,115
BEET LIFTER
Filed Feb. 4, 1939　　　3 Sheets-Sheet 1
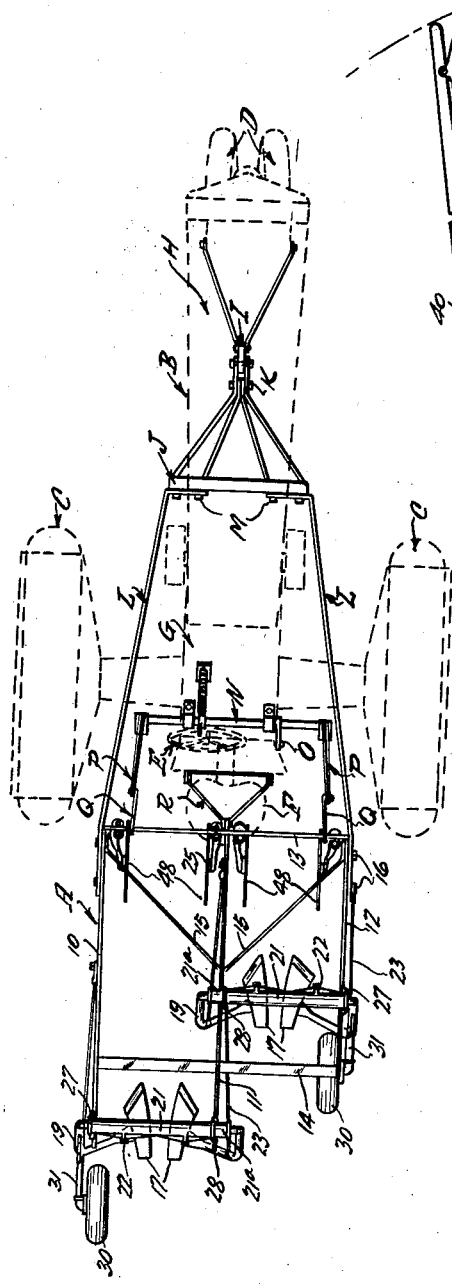
Inventor
WILLIAM E. KNAPP
By Carlsen & Hazle
Attorneys

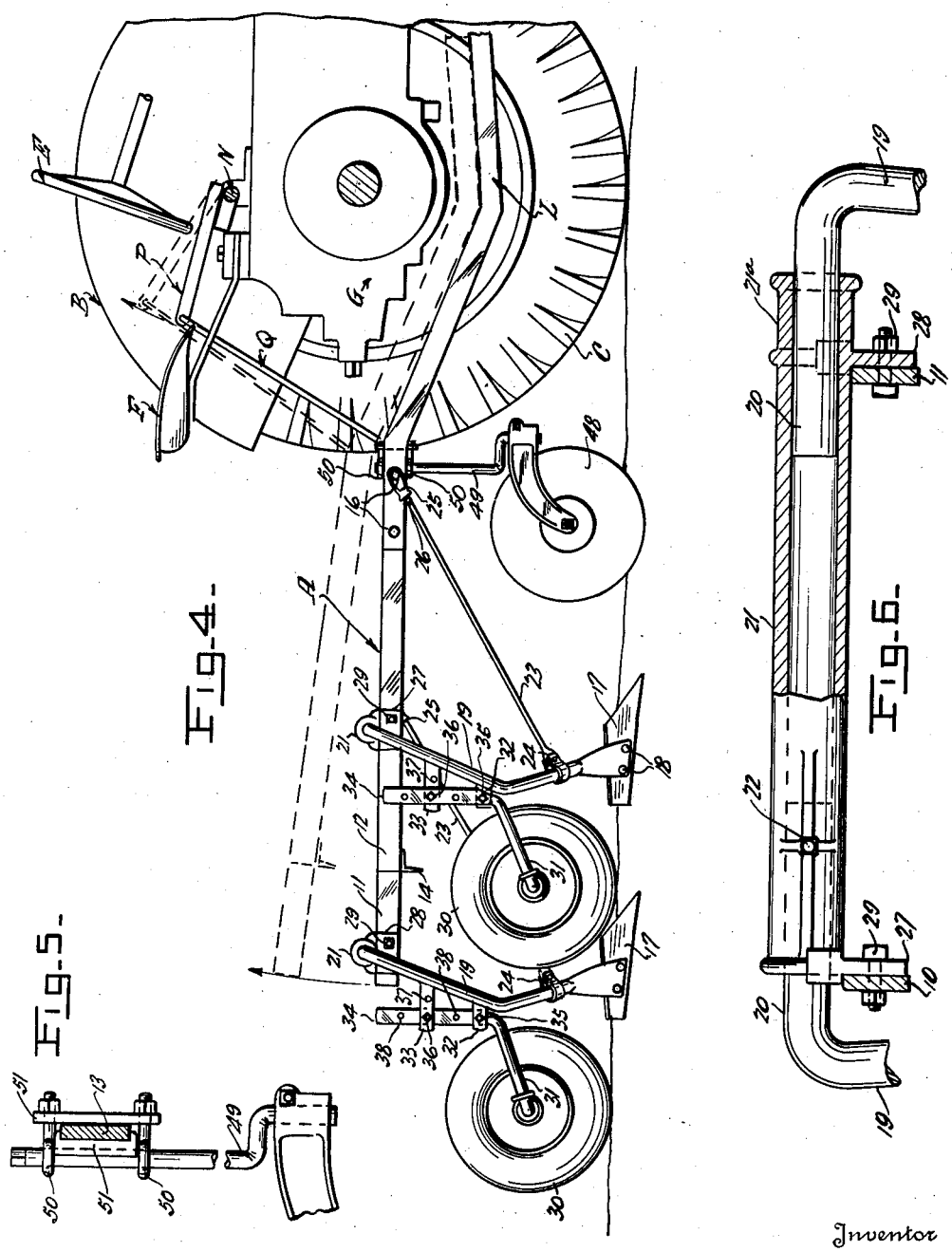

Inventor
WILLIAM E. KNAPP
Carlsen & Hazle
Attorneys

Patented Oct. 1, 1940

2,216,115

UNITED STATES PATENT OFFICE 2,216,115

BEET LIFTER

William E. Knapp, Moline, Ill., assignor to Minneapolis-Moline Power Implement Company, Minneapolis, Minn., a corporation of Delaware Application February 4, 1939, Serial No. 254,617

15 Claims. (Cl. 55—106)

This invention relates generally to improvements in harvesting implements and more particularly to a beet pulling implement for attachment to a tractor.

The primary object of the invention is to provide, in a simple, efficient, and novel form, an implement for attachment to a tractor and which will effectively pull or lift beets or other similar row crops in two adjacent rows as the implement is drawn over the field. Another object is to provide an implement of this kind having means for adjustment of the actual crop pulling tools which will allow variations in spacing to be made between the tools to adapt the implement for use upon different types and unit sizes of crop, and also to use on crops having any usual spacing between rows. A further object is to provide gauge wheels for regulating the working depth of the tools and which are so located and supported that they will clear the path of the tools and run upon the unworked ground to thus constantly and evenly regulate the working depth. A further object is to provide adjustable mounting and supporting means for said gauge wheels to permit their vertical adjustment within necessary limits according to the required working depth of the tools, and also to permit the wheels to be dropped a substantial distance relative to the tools when it is necessary that the wheels run in the deep furrows or ditches between rows in irrigated fields. Still a further object is to provide, in an implement of this kind, a series of rolling coulters, arranged to run ahead of the tools and cut into the ground alongside the crop rows in such manner that the strip of ground worked by the following tools will be laterally demarked by the parallel cuts made by the coulters, and the tendency of the gauge wheels, to throw up clods in the path of the gauge wheels, under certain conditions of the soil, will be eliminated.

These and other more detailed and specific objects will be disclosed in the course of the following specification, reference being had to the accompanying drawings, in which:

Fig. 1 is a plan view of the implement and associated draft and lifting means for attachment to the tractor, the tractor being shown in dotted lines.

Fig. 2 is an enlarged fragmentary side elevation of a rear portion of the implement showing one pulling tool and one gauge wheel, and indicating different possible running positions of the wheel relative to the tool.

Fig. 3 is a similar view but showing a means for remotely adjusting and controlling the gauge wheel position from the tractor seat.

Fig. 4 is a side elevation of the entire implement and a rear portion of the tractor, the latter being in this case shown in full lines and with the near wheel removed.

Fig. 5 is an enlarged fragmentary cross section through a forward upper part of the implement frame showing the coulter mounting.

Fig. 6 is an enlarged view, partially in rear elevation and partially in transverse section of one supporting assembly for the pulling tools.

Figure 7:
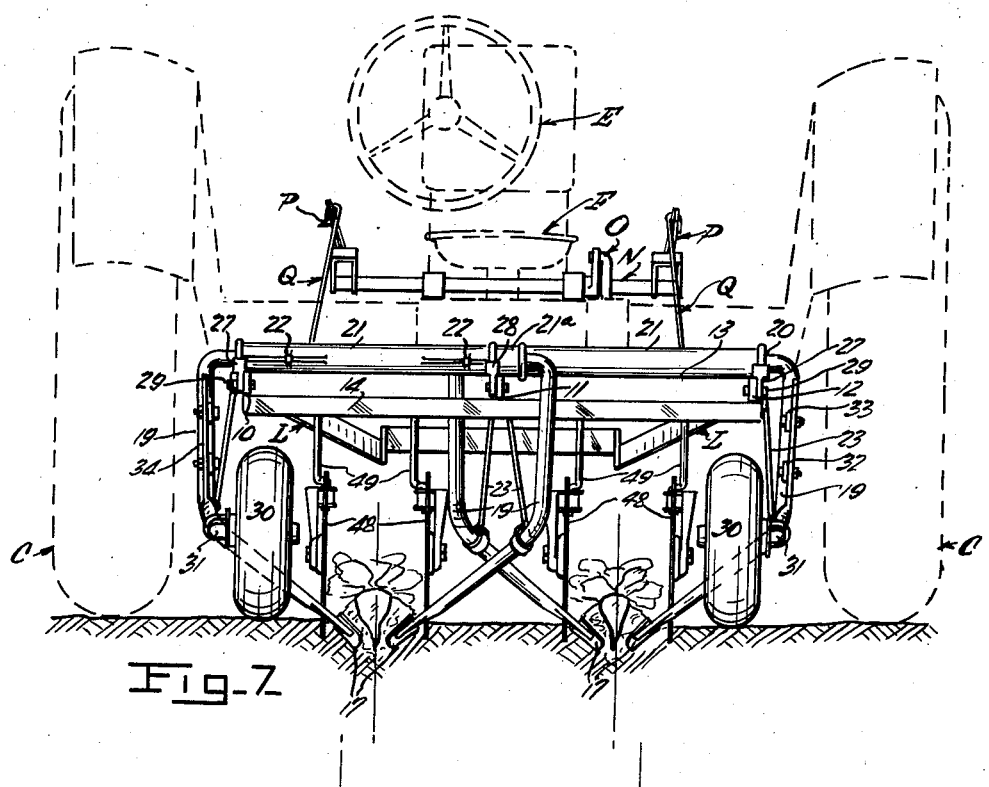
Fig. 7 is a rear view of the implement in working position and showing the tractor again in dotted lines.

Referring now more particularly and by reference characters to the drawings, my improved implement is designated generally at A and is shown as arranged behind a conventional tractor B of the row crop type having the wide spaced rear traction wheels C and closely spaced dirigible front wheels D which may be steered by the steering wheel E located convenient to the operator's seat F. The usual transmission housing G and forwardly disposed power unit and tank assembly H are provided.

Beneath the tractor and at a forwardly located point a hitch plate I is rigidly secured and braced and to this is attached the beam hitch J upon a horizontal transverse pivot axis defined by the attaching pin K. Draft bars L are secured at M to the hitch J and extend rearwardly beneath the tractor and upwardly to terminate at a point and at a level convenient for their connection to the frame of the implement A. Conventional power lift mechanism is also provided and which includes the lifting roll or rock shaft N operated by connection O to the power lift take-off of the tractor and having lifting arms P turned rearwardly for connection by the rods Q to the implement.

The foregoing arrangement of draft connections and power lift is conventional, and the lift of course operates to raise or lower the implement A by corresponding adjustment of the arms P, and in this operation the entire implement moves in a vertical plane about the axis afforded by the forwardly disposed draft connection K. Manually operated lift means (not shown) may also be used in lieu of, or supplemental to, the power lift and may be of any usual form. An equalizer or bracing assembly is indicated at R for equalizing angular stresses upon the structure.

The implement A comprises a frame made up of three longitudinally extended and transversely spaced frame bars 10, 11, and 12, which are connected at front and rear by cross bars 13 and 14 with suitable braces 15 provided in order to form a rigid, substantially rectangular structure, as shown. The forward ends of the laterally or outwardly disposed bars 10 and 12 are secured by bolts 16 to the rear extremities of the draft bars L so that the frame is extended rearwardly and substantially horizontally behind the tractor to travel therewith.

The frame thus formed supports the lifting tool units or gangs which in the present instance are shown as being two in number for operating upon adjacent crop rows, and which are accordingly transversely spaced beneath the frame to the desired row spacing. Each tool assembly includes, as the actual working elements, a pair of blades 17 of usual form and which are secured at 18 to the downwardly and inwardly turned extremities of suitable standards or supporting members 19. The individual blades of each tool assembly are spaced apart transversely to run at opposite sides of the crop rows at proper spacing and angle to pull or lift the beets as will be hereinafter pointed out in detail and, inasmuch as spacing variations must be made to meet different soil conditions and variable beet sizes, as well as to cope with the differences in spacing between crop rows, the standards 19 are supported upon the frame in a novel manner to permit such adjustments. It will be noted that one of the tool assemblies is set ahead of the other some distance, and while this may be either one, the drawings illustrate the right hand tool as forwardly disposed relative to the left hand tool.

The laterally disposed shank portion of each standard 19 terminates upwardly in a horizontally turned wrist portion 20 and in the set up of the tool assemblies these portions 20 of the pairs of standards are turned inwardly toward each other to fit nicely into the ends of the tubular tool mounting members or sleeves 21 which are mounted transversely on the frame. These wrist portions 20 may be locked in position in the sleeves 21 by radially extended set screws 22, and the standards may be swung forwardly or rearwardly on the axes afforded by the wrist portions and in vertical planes to tip the blades 17 to the proper longitudinal or entering angle as well as to make some slight adjustments of the vertical position of the blades relative to the frame. Angular brace rods 23 are extended forwardly and upwardly from a pivotal connection at 24 to a lower portion of the shank of each standard 19 and are secured at 25 to the frame bars 10, 11, and 12 in convenient positions. These rods have threaded connections at 26 with their forward fastening members so that they may not only brace the standards and blades against rearward strain due to ground resistance but may be adjusted, turnbuckle fashion, to vary the working angle of the blades as hereinbefore pointed out.

The sleeves 21 are provided at one end with flat, radially extended and apertured lugs or ears 27 and adjacent their other ends with longitudinally spaced and aligned identical lugs or ears 28, the latter being so disposed that an end portion 21a of each sleeve extends for some distance. The spacing between the lugs 27 and 28 is identical with the spacing between the outer frame bars 10—12 and the center bar 11, and the lugs will thus fit nicely and downwardly over either the inner or outer vertical faces of these bars for fastening thereto by means of bolts 29 passed through the ears and bars.

Figure 8:
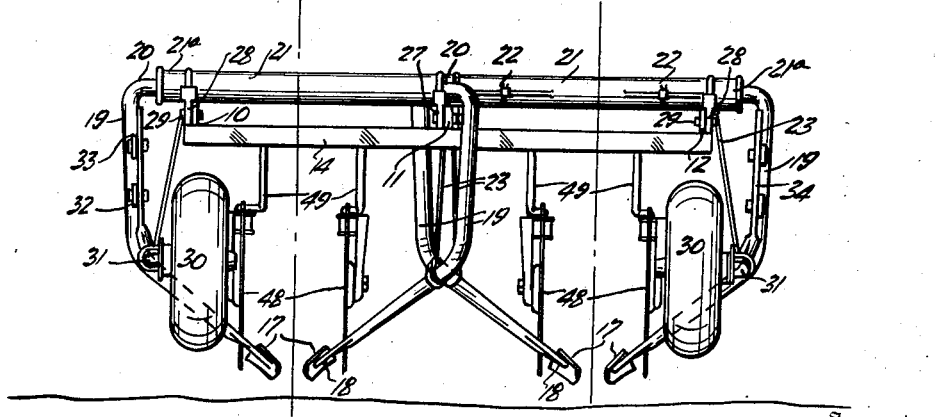
Fig. 8 is a similar view of the implement alone, but in an elevated or transport position, and showing the tools adjusted for a row spacing greater than that illustrated in Fig. 7.

Spacing adjustments between the respective pairs of blades 17 may be made, as will now be described. For the narrowest tool spacing, and to work the closest rows, the ears 27—28 of the sleeves 21 are arranged at the inner sides of the frame bars 10—11 and 11—12 and the extended ends 21a of the sleeves are turned inwardly. The standards of each tool assembly are then supported in proper position by the sleeves for running the blades along the sides of these crop rows. An increase in spacing equivalent to twice the thickness (horizontally) of the frame bars may be readily made by placing the ears 27—28 at the outer sides of the bars as shown in Fig. 7. However, a larger increase, equal to twice the projection or extension of the sleeve ends 21a, may also be made by disconnecting the standards 19 from the sleeve, reversing the sleeves end for end to dispose their extensions 21a outwardly, and then replacing the standards as shown in Fig. 8. The relative row spacing variations thus accomplished may be noted from the respective spacing of the dot-dash lines indicating row centers in Figs. 7 and 8. In this latter position spacing adjustments may again be made by choice of mounting the ears inside or outside of the frame bars as previously described. It will thus be evident that the spacing may be varied as required to meet row spacing requirements by merely axially shifting and reversing the sleeves on the frame and in most cases without disturbing spacing between the individual blades of each pair.

In order to regulate the working depth of the blades 17 I provide a pair of gauge wheels 30, one of which is mounted at each side of the implement, and which run behind and laterally outward of the respective tool assemblies. The gauge wheels are preferably, though not necessarily, of the pneumatic-tired type and are journaled upon arms 31 which extend forwardly and upwardly to points of adjustable connection with the outermost standards 19. For this purpose the upper shanks of the standards are provided with rearwardly turned and vertically spaced mounting lugs or brackets 32 and 33, welded or otherwise secured in place, and the forward extremities of the arms 31 are provided with flat, upwardly turned tangs or tongues 34 adapted to fit alongside said brackets. Bolts 35 and 36 secure the tangs to the upper and lower brackets and one bracket, for instance the upper one 33, at each side is extended longitudinally and horizontally and provided with spaced apertures 37 for the bolt, so that by choice of position of this bolt the angular position of the tangs may be varied causing a consequent variation in vertical position of the gauge wheels relative to their respective tools as shown in Figs. 2 and 4. Also the tangs 34 are extended and provided with a series of spaced bolt receiving apertures 38 so that they may be adjusted vertically on the standards as shown in dotted lines in Fig. 2. In this adjusted position the tangs may also be swung forwardly or rearwardly, as the case may be, for further minor adjustment.

The gauge wheels 30 are thus arranged in position to trail their respective tools, and to run alongside the path or strip of ground worked by the blades 17 so that the wheels will encounter no obstruction or inequality in the surface on which they travel. Accordingly the wheels may, by the means and in the manner set forth, be adjusted to run at a desired level relative to the blades to gauge and evenly regulate the penetration of the blades according to the nature of the soil and the kind and size of crop being harvested. In some cases the spaces between rows in which the gauge wheels run will be found to be considerably depressed relative to the rows themselves, such as where irrigation ditches are formed between rows, and for this work the wheels are dropped down a substantial amount by changing the bolts to suitable pairs of the adjustment holes 38 and thereafter minor adjustments may again be made for proper penetration by swinging the wheel mounting parts as described.

If, in variation of the tools for various row spacings or for other reasons, it be found at any time desirable to adjust the spacing (transversely) between the gauge wheels and the tools, this may be accomplished by moving the tangs 34 to either inner or outer sides of the brackets 32 and 33 as shown comparatively in Figs. 7 and 8.

It may also be found to be desirable to effect at least minor adjustments of the gauge wheels during actual operation of the implement, and for this purpose each wheel assembly may be arranged as shown in Fig. 3. Here the tang 39 for the gauge wheel 30 is extended upwardly and forwardly in the form of a hand lever 40 (or the lever may be separately fabricated and fastened to the tang) and a notched quadrant 41 is substituted for the upper bracket. The tang 39 is pivoted by bolt 42 upon a lower bracket 43 and the wheel is adjusted by swinging the hand lever 40 and securing it in adjusted position by engagement of a pawl 44, controlled by usual mechanism 45, with the quadrant 41. The hand lever is, of course, extended to a position for convenient operation from the seat of the tractor. The previously described major vertical adjustment of the wheel may again be made by engaging the bolt 42 with an upper hole 46 in the tang 39 and the quadrant 41 is made adjustable by clamp 47 on the standard 19 in order to maintain proper relative positions of the parts. The tang may also be arranged on inner or outer sides of the bracket 43 and quadrant 41 for transverse spacing adjustment of the wheel 30 relative to the tool, and the pawl 44 is for this purpose one which will engage the quadrant from either side of the tang.

Rolling coulters 48 are provided at the frontal end of the implement frame, and their upright supporting shanks 49 are adjustably mounted by eye bolts 50 and clamp plates 51 upon the frontal frame bar 13 as best shown in Fig. 5. The coulters are arranged in transversely spaced pairs and the individual elements of each pair are disposed ahead of the blades 17 to run in parallel lines spaced outwardly a short distance from the lateral edges of the blades. The mounting of the coulters permits of their adjustment to maintain such desired relative alignment with the blades as row spacing adjustments of the blades themselves are made, as will be readily evident.

In operation the implement is drawn over the field parallel with the rows and the blades 17 are adjusted to run at each side of two adjacent rows and pull the beets or other crop. In this operation the soil around the beets is loosened but no clods will be thrown up and aside due to the action of the coulters 48 in cutting narrow strips along the sides of the soil worked. The gauge wheels 30 may thus run upon the smooth surface between rows and they will accordingly properly regulate the working depth of the blades in cooperation with rough depth adjustments which may be made by raising and lowering the entire implement. Adjustments may be made of the blades, coulters, and gauge wheels to meet any crop and soil conditions which may be encountered, and the implement will thus be seen to be an extremely convenient and effective device for its purpose. In transport position the tools are all moved clear of the ground and the tractor may be maneuvered without interference from the implement.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an implement, a wheel supported frame including evenly spaced longitudinally extended parts, crop working tools, mounting members on the said frame parts and supporting the said tools in transversely spaced crop working position, the said mounting members being mounted in an off center position relative to the longitudinal medial line between the spaced frame parts and being reversible end for end on said parts for securing the tools in transversely adjusted positions with respect to each other and to the frame.

2. In an implement, a frame, a tool mounting member transversely disposed on said frame, mounting means extended from said member at unequal spacing relative to its center and adjustably and detachably connected to said frame, tools supported from end portions of the tool mounting member, and the said mounting member being reversible end for end on the frame for positioning the tools in transversely adjusted locations relative to said frame.

3. In an implement, a frame, a tool mounting member mounted on the frame, attaching lugs on the said member and unevenly spaced with respect to the ends thereof, tools supported from the ends of the member, and the said member being detachably connected by said lugs to the frame and reversible end for end thereon to shiftably secure the tools relative to the frame.

4. In a beet lifter, a frame, draft means for the frame, beet lifting tool assemblies supported in transversely spaced relation on the frame and adjustable transversely for operating upon beet rows of various spacings, and gauge wheels supported from the tool assemblies for transverse adjustments both independently of and together with the tool assemblies, the said gauge wheels being adapted to run between the rows and evenly control the penetration of the tools.

5. In a beet lifter, a frame, draft means connected to the forward end of the frame, beet lifting blades, standards supporting the blades from the frame and adjustable transversely with respect to the frame for adjusting the spacing of the blades according to the spacing between adjacent beet rows, and gauge wheels supported from the outermost standards for spacing adjustments therewith and in laterally offset relation relative to the blades to thereby cause the wheels to run over ground undisturbed by the blades.

6. In a beet lifter, a frame, draft means connected to the forward end of the frame, beet lifting blades, standards supporting the blades from the frame and adjustable transversely with respect to the frame for adjusting the spacing of the blades according to the spacing between adjacent beet rows, gauge wheels supported from the said standards for spacing adjustments therewith and in laterally offset relation relative to the blades to thereby cause the wheels to run over ground undisturbed by the blades, and means for adjusting the said gauge wheels transversely with respect to the frame and independently of the row spacing adjustments of the blades.

7. In a beet lifter, a frame, beet lifting tool assemblies mounted on the frame and including tool mounting shanks, gauge wheels for regulating the penetration of the tools in the ground, and arm members adjustably and pivotally connecting the gauge wheels to the outermost tool shanks for vertical and horizontal adjustments relative to the tools.

8. In a beet lifter, a frame, beet lifting tool assemblies on the frame and including generally upright tool mounting shanks, gauge wheels, supporting members forming axles for the wheels, the said members being pivotally and adjustably connected to the tool mounting shanks and supporting the wheels for travel between adjacent beet rows, and means for vertically adjusting the wheels relative to the tools for controlling tool working depth, and means for lowering and adjusting the wheels for travel in ditches between irrigated beet rows.

9. In a beet lifter, a frame, beet lifting tools on the frame, gauge wheels supported in offset relation to the tools for travel between adjacent beet rows to control the penetration of the tools, means supporting the wheels at either of two preselected levels relative to the tools and according to the relative elevation of the ground between rows, and means for adjusting the wheels, in either selected position, vertically with respect to the tools.

10. In a beet lifter, a frame, beet lifting tool assemblies on the frame, gauge wheels supported for travel between adjacent beet rows to control the working depth of the tools, means supporting the gauge wheels at a selected mean height relative to the tools and according to the elevation of the ground between the beet rows, and means adjustably and pivotally connecting the wheels and tool assemblies for remotely controlling and vertically adjusting the wheels through a minor range at any preselected mean vertical position thereof.

11. In a beet lifter, a frame, draft means for the frame, tools for lifting beets in adjacent rows, gauge wheels supported for travel behind the tools and in laterally offset planes over ground undisturbed by the tools, and coulters disposed forwardly of the tools and outwardly thereof to penetrate the ground along lines spaced inwardly from the said gauge wheels and thereby demark the lateral limits of the strips of ground worked by the tools to prevent earth from being thrown up by the tools into the path of the wheels.

12. In an implement, a frame, draft and supporting means for the frame, the said frame including transversely spaced and longitudinally extended center and outer parts, tool mounting members adjustably mounted transversely on the frame and supported at outer ends upon the outer frame part and at inner ends upon the center frame part, beet pulling tools supported from the mounting members, and the said tool mounting members being spaced apart longitudinally of the frame for endwise, transverse adjustments with respect to said frame parts.

13. In a beet lifter, a frame including transversely spaced and longitudinally extending parts, a tool mounting member having extended lugs spaced lengthwise thereon a distance equal to the transverse spacing of said frame parts, the said mounting member being transversely disposed on the frame with its lugs selectively engageable with opposite faces of the frame parts, and beet lifting tools supported from the mounting member.

14. In a beet lifter, a frame including transversely spaced parts, a tool mounting member disposed transversely on the frame, beet lifting tools supported from the tool mounting member, and lugs extended from the member for connection to the spaced frame parts, one of said lugs being disposed at different spacing from the end of the member than the other lug whereby the endwise reversal of the position of the member on the frame parts will shift the member transversely with respect to the frame.

15. In a beet lifter, a frame, a tubular mounting member supported on the frame, standards adjustably supported in the ends of the mounting member for endwise adjustment therein, beet lifting tools carried by the standards and adjustable by endwise movement of the standards in the mounting member for varying the spacing between the tools, and means supporting the mounting member for adjustment on the frame as a unit with the standards and tools without disturbing the spacing between the tools.

WILLIAM E. KNAPP.